United States Patent [19]
Imura

[11] 3,772,979
[45] Nov. 20, 1973

[54] SHUTTER RELEASE DEVICE FOR CAMERA

[75] Inventor: Toshinori Imura, Sakai, Japan
[73] Assignee: Minolta Camera Kabushiki Kaisha, Osaka, Japan
[22] Filed: June 12, 1972
[21] Appl. No.: 261,756

[52] U.S. Cl............................. 95/53 EB, 95/10 CT
[51] Int. Cl............................ G03b 9/08, G03b 7/08
[58] Field of Search............. 95/10 C, 10 CT, 53 EB, 95/53 EA

[56] References Cited
UNITED STATES PATENTS

| | | | |
|---|---|---|---|
| 3,626,826 | 12/1971 | Patscher | 95/10 CT |
| 3,650,193 | 3/1972 | Munetaku Shimizi | 95/10 CT |
| 3,496,852 | 2/1970 | Rittman | 95/53 EB |
| 3,456,569 | 7/1969 | Noack | 95/53 EB |

Primary Examiner—Joseph F. Peters, Jr.
Attorney—Stanley Wolder

[57] ABSTRACT

A device comprises electric exposure control means having an electromagnet the energizing current of which is to be controlled by an exposure control electric circuit, first shutter release means for closing a main switch of the control means and initiating a shutter opening action through a shutter release operation, an attractable member cooperable with the electromagnet to initiate a shutter closing action upon deenergization of the electromagnet, and second shutter release means mechanically associated with the attractable member for mechanically bringing the attractable member to the attracted position and initiating a shutter opening action through a shutter release operation, the second shutter release means being adapted to permit the attractable member to return to the unattracted position when freed from the shutter release operation.

6 Claims, 3 Drawing Figures

SHUTTER RELEASE DEVICE FOR CAMERA

BACKGROUND OF THE INVENTION

The present invention relates to a shutter release device, more particularly to a shutter release device including shutter release means for flash bulb photography to be incorporated in a camera equipped with an electronically controlled shutter.

In taking a flash bulb photograph with a conventional camera including an electronically controlled shutter, the exposure dial is set to Bulb B to change over the switch of exposure control circuit or to shift a changeover member.

However, with a device wherein the switch of the exposure control circuit is changed over, current flows through the electromagnet of the exposure control circuit while taking a flash bulb photograph, namely while the film is being exposed, resulting in marked consumption of power and therefore prompt drain of the battery. In the case of a device including a shiftable changeover member, the shutter actuating mechanism is operatively associated with one shutter release member, so that the device is complex in its construction, hence disadvantageous.

SUMMARY OF THE INVENTION

An object of this invention is to provide a shutter release means to be incorporated in combination with the usual shutter release means in a camera including an electronically controlled shutter, the shutter release means of this invention being intended specifically for flash bulb photography and having a very simple construction.

Another object of this invention is to provide a mechanism which is operable completely independently of the exposure control circuit in operating the shutter release means for flash bulb photography.

In a camera having an electronically controlled shutter which is kept open during energization of an electromagnet included in electronic exposure control means and which is initiated into closing action upon deenergization of the electromagnet, the present invention provides a device comprising first shutter means for actuating the exposure control means to energize the electromagnet and initiate a shutter opening action, an attractable member to be attracted to and retained by the electromagnet approximately simultaneously with the initiation of the shutter opening action to prevent movement of a shutter closing effecting member at its attracted position, the attractable member being operable to initiate the shutter closing effecting member into movement upon deenergization of the electromagnet, and second shutter release means mechanically associated with the attractable member and operable to retain the attractable member at the magnetically attracted position to permit the shutter to start opening when depressed, the second shutter release means being adapted to be returned to the original position when freed from the depression to permit the attractable member to move back to the unattracted position and initiate a shutter closing action.

According to this invention, the electronically controlled shutter to be controlled by the electric exposure control means can be operated by operating the first shutter release means, and by operating the second shutter release means, the shutter is opened for flash bulb photography while the operating portion of the second means is being depressed.

The second shutter release means initiates a shutter opening action without energizing the electromagnet included in the electric exposure control means and mechanically operates a mechanically operable member which causes the shutter to open and close. Because the second shutter release means is provided independently of the first shutter release means, the device can be greatly simplified.

Further according to this invention, the second shutter release means operates independently of the electric exposure control means in taking a photograph with a flash bulb, without consuming any electric power, making it possible to prevent malfunction during a flash bulb photographing operation.

Other objects and features of this invention will become more apparent from the following description of embodiments of this invention.

DESCRIPTION OF THE PREFERRED EMBODIMENTS

Figure 1:
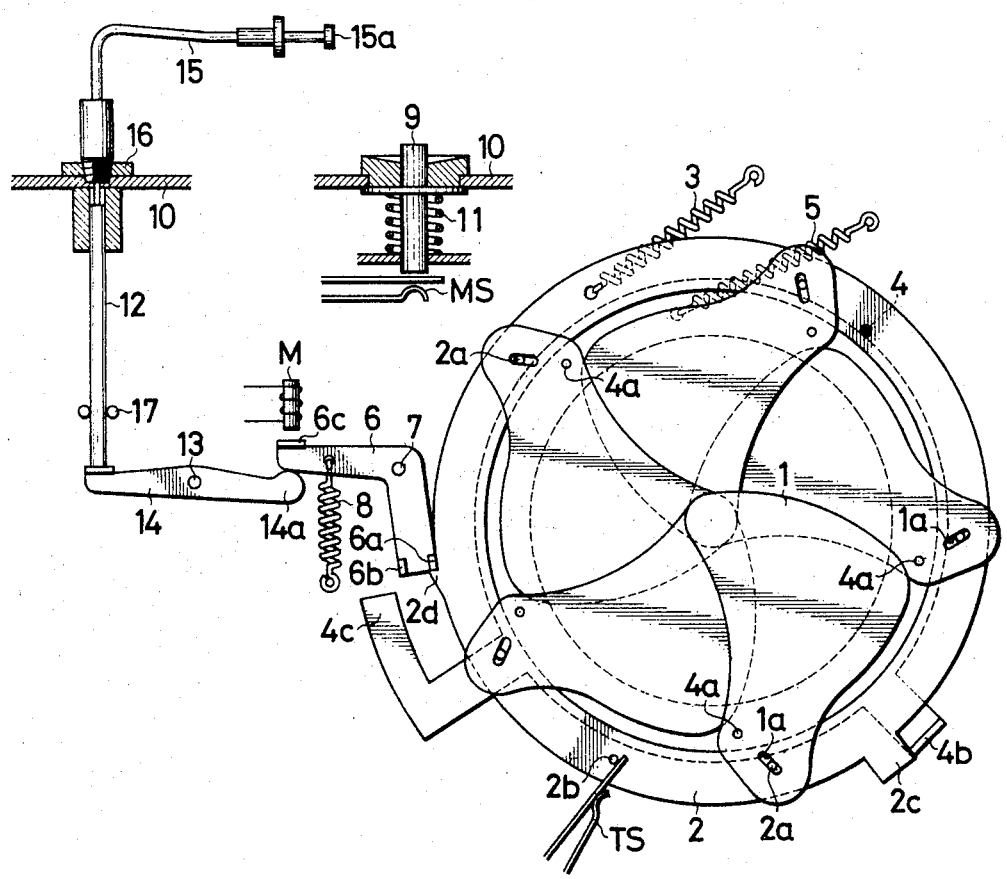
FIG. 1 is a front view showing principal parts of a construction embodying the present invention with the shutter in its cocked position.

FIG. 1 shows sectors 1 and an opening effecting member 2 which is urged by a spring 3 for clockwise rotation. A closing effecting member 4 is likewise urged by a spring 5 for clockwise rotation. Each of the sectors 1 is pivotally supported by a pin 4a on the closing effecting member 4 and has a slot 1a in which is engaged a pin 2a on the opening effecting member 2. Clockwise rotation of the opening effecting member 2 causes the sectors 1 to move about the pins 4a in a clockwise direction to open the shutter. Subsequent clockwise rotation of the closing effecting member 4 causes the sectors 1 to move about the pins 2a in a counterclockwise direction to close the shutter.

The opening effecting member 2 has, in addition to the pins 2a, a pin 2b for closing a trigger switch TS upon a shutter cocking operation which switch TS is included in an exposure control circuit for an electronically controlled shutter and opening the switch TS simultaneously with the opening movement, an arm 2c to be brought into engagement with a bent arm 4b extending from the outer periphery of the closing effecting member 4 when the opening effecting member 2 is driven in a counterclockwise direction by a shutter cocking operation so as to move the member 4 counterclockwise along with the member 2, and a projection 2d engageable with a lug 6a of an attractable member 6 upon completion of the shutter cocking operation so that the member 2 will be retained in its cocked position.

Besides the pins 4a and bent arm 4b, the closing effecting member 4 has on its outer periphery an L-shaped arm 4c whose distal end is engageable with a lug 6b of the attractable member 6 the moment when the opening effecting member 2 starts to open the shutter, the member 4 thus being temporarily prevented from rotation.

The attractable member 6 pivoted at 7 is urged by a spring 8 in a counterclockwise direction and has besides the lugs 6a and 6b, an attraction piece 6c opposing an electromagnet M.

A shutter button 9 for actuating first shutter release means, disposed at a suitable portion of a camera body 10, is urged upward by a spring 11. When depressed, the shutter button closes a main switch MS of the exposure control electric circuit.

Figure 2:
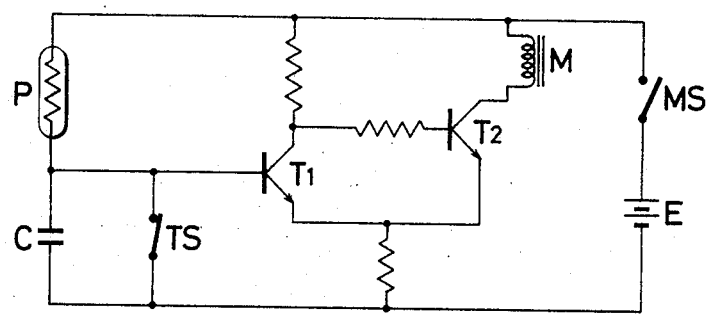
FIG. 2 is a circuit diagram showing an example of exposure control electric circuit of an electronic shutter.

As already known, the exposure control electric circuit has a construction as shown in FIG. 2. Closing of the main switch MS permits a power source E to apply voltage to the base of a transistor $T_2$ to bring the transistor $T_2$ into conduction and energizes the electromagnet M, which in turn attracts the attraction piece 6c of the attractable member 6, rotating the member 6 in a clockwise direction. The lug 6a therefore releases the projection 2d to initiate the opening effecting member 2 into movement under the action of the spring 3. Simultaneously with the shutter opening action thus effected, the lug 6b comes into engagement with the end of the L-shaped arm 4c to prevent the movement of the closing effecting member 4 on which the spring 5 is acting.

Simultaneously with the initiation of the foregoing movement, the opening effecting member 2 opens the trigger switch TS, whereupon the battery E applies voltage to a capacitor C through a photocell P to start charging of the capacitor C. The charging speed (time) is controlled by the photocell P which receives reflected light from the subject and whose resistance value varies in accordance with the brightness of the subject.

When the voltage in the capacitor C builds up to a predetermined value through charging, a transistor $T_1$ is brought into conduction, with the transistor $T_2$ rendered nonconductive, whereby the electromagnet M is deenergized.

The deenergization of the electromagnet M permits the attractable member 6 to move back in a counterclockwise direction under the action of the spring 8, freeing the L-shaped arm 4c from engagement with the lug 6b and thereby allowing the closing effecting member 4 to rotate in a clockwise direction to close the shutter.

After completion of shutter closing, an unillustrated shutter cocking member is operated to cock the shutter. Through the shutter cocking operation, the opening effecting member 2 rotates counterclockwise while tensioning the spring 3 along with the closing effecting member 4, which is therefore driven in a counterclockwise direction and the spring 5 is tensioned. Upon completion of the shutter cocking operation, the lug 6a of the attractable member 6 comes into engagement with the projection 2d. The parts are now retained in the illustrated position.

A release rod 12 serving as second shutter release means is supported at a suitable portion of the camera body 10 in vertically movable manner and has a lower end in contact with one end of an interlocking lever 14 pivoted at 13. The interlocking lever 14 has its front end 14a in contact with the attractable member 6. Depression of the release rod 12 rotates the interlocking lever 14 in a counterclockwise direction, causing the front end 14a to rotate the attractable member 6 in a clockwise direction and press the attraction piece 6c against the electromagnet M. When freed from the depressing force, the members 12, 14 and 6 are returned to the original position by the spring 8. The drawing shows a release wire 15 and a release wire attaching portion 16. By pushing in the operating portion 15a of the release wire 15, the release rod 12 is depressed, while when freed from the pushing force the release rod 12 will be returned along with the interlocking lever 14 and attractable member 6. A guide 17 guides the release rod 12 as it is moved up and down.

According to the foregoing construction, depression of the release rod 12 causes the attractable member 6 to disengage the projection 2d from the lug 6a completely independently of the exposure control electric circuit (accordingly, without energization of the electromagnet M) to initiate the opening effecting member 2 into a shutter opening action. At the same time, the attractable member 6 prevents the rotation of the shutter closing effecting member 4. On the other hand, when released from the depressing force, the release rod 12 causes the lug 6b to release the L-shaped arm 4c to initiate the shutter closing effecting member 4 into movement for a shutter closing action.

As will be apparent from the description above, the second shutter release means will be operated for flash bulb photography, the first shutter release means being left intact during this operation.

Figure 3:
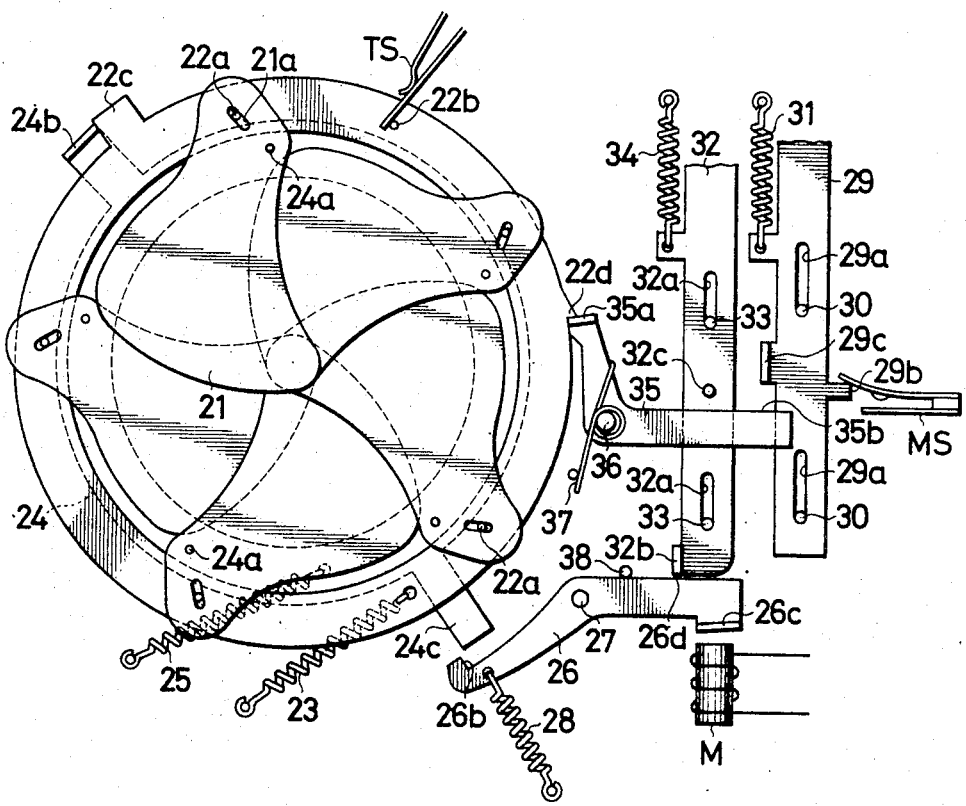
FIG. 3 is a front view showing principal parts of another embodiment of this invention with the shutter in its cocked position.

FIG. 3 shows another embodiment of this invention which includes sectors 21, an opening effecting member 22 urged in a clockwise direction by a spring 23 and a closing effecting member 24 urged in a clockwise direction by a spring 25.

Each of the sectors 21 is pivoted at 24a on the closing effecting member 24 and has a slot 21a in which is engaged a pin 22a on the opening effecting member 22. As in the foregoing embodiment, clockwise rotation of the opening effecting member 22 opens the shutter and clockwise rotation of the closing effecting member 24 closes the shutter.

Besides the pins 22a, the opening effecting member 22 has a pin 22b for closing a trigger switch TS just before the completion of counterclockwise rotation of the opening effecting member 22 effected by a shutter cocking operation and opening the trigger switch TS upon initiation of clockwise rotation of the member 22, a projection 22c engageable with a lug 24b of the closing effecting member 24 to rotate the member 24 in a counterclockwise direction when the member 22 rotates in a counterclockwise direction during the shutter cocking operation, and a projection 22d engageable with a lug 35a of a latch member 35 simultaneously with completion of the shutter cocking operation.

The latch member 35 pivoted at 36 is urged by a spring 37 in a counterclockwise direction and has its tail end 35b positioned in the path of downward movement of a first shutter release member 29 corresponding to the aforementioned shutter button and a second shutter release member 32 corresponding to the release rod.

The closing effecting member 24 has, besides the pins 24a and lug 24b, an arm 24c to be engaged by a hook 26b of an attractable member 26 simultaneously when the opening effecting member 22 is initiated into a shutter opening action, the member 24 thus being prevented from rotation for a moment. The arm 24c corresponds to L-shaped arm 4c in the previous embodiment.

The attractable member 26 pivoted at 27 is urged by a spring 28 in a counterclockwise direction and has at its tail end an attraction piece 26c opposing an electromagnet M.

The first shutter release member 29 is supported in upwardly and downwardly movable manner with a guide pin 30 engaged in its slot 29a and is urged upward by a spring 31. The member 29 has a side projection 29b in engagement with a movable piece of main switch MS of an exposure control electric circuit and, when depressed, closes the main switch MS. The member 29 is further formed with a lug 29c which, when the member 29 is depressed as above, pushes the tail end 35b of the latch member 35 to rotate the latch member 35 in a clockwise direction, permitting the projection 22d of the opening effecting member 24 to be disengaged from the lug 35a at its front end, whereupon the effecting member 24 is initiated into a shutter opening action.

Depression of the first shutter release member 29 closes the main switch MS to energize the exposure control electric circuit (see FIG. 2) and energize the electromagnet M to attract the attractable member 26, with the result that the hooked end 26b comes into engagement with the arm 24c of the closing effecting member 24. Thus the member 24 is retained in the illustrated position.

At the same time, the lug 29c of the first shutter release member 29 pushes the latch member 35 into clockwise roation, permitting the opening effecting member 22 to move in a clockwise direction to initiate a shutter opening action.

Simultaneously with the initiation of the shutter opening action, the trigger switch TS opens to commence charging of the capacitor C through a photocell P. When the voltage of the capacitor C reaches a predetermined level, the electromagnet M is deenergized, whereupon the attractable member 26 is urged into counterclockwise movement by the spring 28. Consequently, the closing effecting member 24 is initiated into clockwise rotation to start closing the shutter.

When an unillustrated shutter cocking member is operated to cock the shutter after taking a photograph, the opening effecting member 22 rotates in a counterclockwise direction along with the closing effecting member 24 and is retained in the illustrated position by the latch member 35 upon completion of the shutter cocking operation.

Operation of the device for usual photography has been described. For flash bulb photography, the second shutter release member 32 is depressed.

The second shutter release member 32 is supported in upwardly and downwardly movable manner with a guide pin 33 engaged in its slot 32a and is urged upward by a spring 34. The member 32 has at its lower end a lug 32b positioned close to a driven portion 26d at the tail end of the attractable member 26. A pin 32c is further provided on the member 32 for engagement with the tail end 35b of the latch member 35.

Depression of the second shutter release member 32 causes its lug 32b to push the driven portion 26d of the attractable member 26 to drive the member 26 in a clockwise direction, thereby bringing the attraction piece 26c into pressing contact with the electromagnet M and causing the hooked front end 26b to engage the arm 24c of the closing effecting member 24.

At the same time, the pin 32c pushes the tail end 35b of the latch member 35 to drive the member 35 in a clockwise direction, thereby initiating the opening effecting member 22 in a clockwise movement for commencement of a shutter opening action.

While the second shutter release member 32 is in the depressed position, the closing effecting member 24 is prevented by the attractable member 26 from its clockwise rotation. Since the main switch MS is open, the electromagnet M is in unenergized state, and the attractable member 26 has its attraction piece 26c pressed against the electromagnet simply mechanically by the second shutter release member 32.

When freed from the depressing force, the second shutter release member 32 returns upward under the action of the spring 34, allowing the attractable member 26 to move counterclockwise under the action of the spring 28, with the result that the closing effecting member 24 starts moving in a clockwise direction for a shutter closing action.

In this way, a flash bulb photographing operation is conducted by operating the second shutter release member 32. Indicated at 38 in the drawing is a stopper for retaining the attractable member 26 in such position that its hooked end 26b is out of engagement with the arm 24c of the closing effecting member 24.

Furthermore, a prior art can of course be applied to the attractable member 26 wherein the attractable member 26 is retained mechanically in the attracted position in operative relation to the opening effecting member 22 upon a shutter cocking operation, although such construction is not illustrated in FIG. 3. In this case, the second release member 32 shifted to the depressed position retains the attractable member at the initial position after the opening effecting member.

For simplification and a better understanding, FIGS. 1, 2 and 3 show only one power source switch MS to be operated by the release member 9 or 29. It will be apparent that the switch may alternatively comprise at least one switch operatively associated with blade driving means or winding means according to the conventional art.

Although the interior construction of camera shown in the drawings includes the first release means for ordinary photographing operation and second release means for flash bulb photography, it is possible to operate either one of the release means by one external operating member by way of an intermediate member for selective operation.

What is claimed is:

1. A shutter release device for a camera comprising,
    an electric exposure control means having an exposure control electric circuit including a main switch and an electromagnet whose energizing current begins to flow with closure of said main switch, the end of the flow being controlled by the electric circuit while the main switch is in closed condition:
    a shutter opening means;
    a shutter closing means;
    first shutter release means manually operable for closing the main switch and initiating a shutter opening action of the shutter opening means when operated for shutter release;
    a restricting member movable between a first position and a second position and normally located at the first position, the restricting member being attracted to and retained at the second position by the electromagnet to prevent a shutter closing action of the shutter closing means upon energization of the electromagnet and being returnable to the first position to initiate the shutter closing action upon denergization of the electromagnet, second shutter release means manually operable independently of the first shutter release means to mechanically advance and keep the restricting member to and at the second position and to initiate the shutter opening action when operated for shutter release, the second shutter release means being returnable to permit the restricting member to return to the first position and initiate the shutter closing action when freed from the shutter release operation.

2. The device as set forth in claim 1 wherein the restricting member when located at its first position retains the shutter opening means which retains the shutter closing means when located at the first position and moves to the second position to initiate the action of the shutter opening means upon the respective shutter release operation of one of the two shutter release means.

3. The device as set forth in claim 1 further comprising a latching member retaining the shutter opening means in the cocked position, the latching member being operable to free the shutter opening means from the retention by the respective shutter release operation of one of the two shutter release means.

4. The device as set forth in claim 1 further comprising a camera body provided with a coupling portion for the connection of a release cable the second shutter release means being operable only in response to the actuation of said cable.

5. The device as set forth in claim 1 further comprising a camera body provided with two portions at which the first and second shutter release means are independently operable.

6. The device as set forth in claim 1 further comprising a camera body provided with two release buttons for independently operating the first and second shutter release means.

* * * * *

UNITED STATES PATENT OFFICE
CERTIFICATE OF CORRECTION

Patent No. 3,772,979             Dated November 20, 1973

Inventor(s) TOSHINORI IMURA

It is certified that error appears in the above-identified patent and that said Letters Patent are hereby corrected as shown below:

-- 30  Foreign Application Priority Data

July 28, 1971............46-67473

Signed and sealed this 1st day of July 1975.

(SEAL)
Attest:

RUTH C. MASON
Attesting Officer

C. MARSHALL DANN
Commissioner of Patents
and Trademarks